United States Patent
Li et al.

(10) Patent No.: US 7,529,776 B2
(45) Date of Patent: May 5, 2009

(54) MULTIPLE COPY TRACK STAGE RECOVERY IN A DATA STORAGE SYSTEM

(75) Inventors: Suguang Li, Tucson, AZ (US); David F. Mannenbach, Tucson, AZ (US); Karl A. Nielsen, Tucson, AZ (US); Richard B. Stelmach, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 417 days.

(21) Appl. No.: 11/031,170

(22) Filed: Jan. 7, 2005

(65) Prior Publication Data

US 2006/0155718 A1 Jul. 13, 2006

(51) Int. Cl.
G06F 11/00 (2006.01)
(52) U.S. Cl. ............................. 707/202; 714/2; 714/25
(58) Field of Classification Search ................. 707/200, 707/202, 204, 201; 714/2, 6, 25
See application file for complete search history.

(56) References Cited

U.S. PATENT DOCUMENTS

| | | | |
|---|---|---|---|
| 6,073,218 A * | 6/2000 | DeKoning et al. | 711/150 |
| 6,282,670 B1 * | 8/2001 | Rezaul Islam et al. | 714/6 |
| 6,480,970 B1 * | 11/2002 | DeKoning et al. | 714/6 |
| 6,529,995 B1 * | 3/2003 | Shepherd | 711/114 |
| 6,578,160 B1 * | 6/2003 | MacHardy et al. | 714/43 |
| 6,691,209 B1 * | 2/2004 | O'Connell | 711/114 |
| 7,146,461 B1 * | 12/2006 | Kiselev et al. | 711/114 |
| 2005/0050392 A1 * | 3/2005 | Baba et al. | 714/25 |
| 2005/0071837 A1 * | 3/2005 | Butt et al. | 717/168 |
| 2005/0210323 A1 * | 9/2005 | Batchelor et al. | 714/14 |
| 2008/0104447 A1 * | 5/2008 | Abali et al. | 714/25 |
| 2008/0162994 A1 * | 7/2008 | Szucs et al. | 714/25 |

* cited by examiner

*Primary Examiner*—Don Wong
*Assistant Examiner*—Angela M Lie
(74) *Attorney, Agent, or Firm*—Scully, Scott, Murphy & Presser, P.C.

(57) ABSTRACT

A bad track in a disk device in a data storage system is recovered by determining which cluster in the system the bad track belongs to. If the track belongs to the cluster that discovered that the track was bad, that cluster recovers the track by locating a good copy of the track, staging the good copy of the track to cache, and destaging the good copy of the track storage unit from the cache to all copies of the track, whether good or bad, in the data storage system. If the track belongs to another cluster, the cluster that discovered that the track was bad sends a message to the other cluster to inform it of the bad track, and the other cluster recovers the bad track. In another aspect, all tracks are owned by one server or server cluster, which performs the staging and destaging.

4 Claims, 2 Drawing Sheets

MULTIPLE COPY TRACK STAGE RECOVERY IN A DATA STORAGE SYSTEM

BACKGROUND OF THE INVENTION

1. Field of the Invention

The invention relates generally to the field of computer systems and, more specifically, to a technique for use in a data storage system for recovering a bad track of data, such as in a disk device, when multiple copies of the same data are stored in different tracks.

2. Description of the Related Art

Data storage systems such as storage servers as commonly used by corporations and other organizations have high-capacity disk arrays to store large amounts of data from external host systems. A data storage system may also backup data from another data storage system, such as at a remote site. The IBM® Enterprise Storage Server (ESS) is an example of such a data storage system. Such systems can access arrays of disks or other storage media to store and retrieve data. Moreover, redundant capabilities may be provided as a further safeguard against data loss. For example, the IBM ESS is a dual cluster storage server that includes two separate server clusters that can access the same storage disks.

Depending on the importance of data that is being stored at the data storage system, multiple copies of the data may be maintained on different tracks on the disks to ensure that a good copy of the data is retained even when one or more of the data tracks can no longer be read. For example, a track cannot be read if a medium error is detected on the disk driver, in which case the driver is usually physically defective, or the track is otherwise corrupt. It is important to maintain all copies of a track in a good state so that the correct data can be accessed.

However, dual or other multi-cluster data storage systems are arranged so that, under normal circumstances, only one of the storage clusters has the ability to write to a track. This avoids a situation where both storage clusters try to write data to the same track at the same time. Furthermore, each storage cluster has read access for each track, as well as the ability to detect any bad tracks. Accordingly, the storage cluster detecting a bad track will not be able to recover the bad track, such as by writing data from a corresponding good track over the bad track, if the cluster does not have write access to the bad track. Also, for either a single server or multiple server clusters, there might be more than one bad copy of a track, in which case it is inefficient to recover them one by one.

BRIEF SUMMARY OF THE INVENTION

To overcome these and other deficiencies in the prior art, the present invention provides a technique for automatically recovering all bad copies of a track from an available good copy of the track by using existing stage and destage methods in a data storage system.

In a particular aspect of the invention, at least one program storage device is provided in a first cluster of a data storage system that includes at least the first cluster and a second cluster, wherein the at least one program storage device tangibly embodies a program of instructions executable by at least one processor to perform a method for recovering a bad data storage unit in the data storage system. The method includes determining which of the clusters owns the bad data storage unit, executing a process at the first cluster for recovering the bad data storage unit if the bad data storage unit is owned by the first cluster, and communicating a message to the second cluster that identifies the bad data storage unit if the bad data storage unit is owned by the second cluster.

A related method for deploying computing infrastructure includes integrating computer-readable code into a first cluster of a data storage system that includes at least the first cluster and a second cluster, where the code in combination with the first cluster is capable of performing a method for recovering a bad data storage unit in the data storage system.

In another aspect of the invention, a method for deploying computing infrastructure includes integrating computer-readable code into a data storage system, where the code in combination with the data storage system cluster is capable of performing a method for recovering a bad data storage unit in the data storage system. The method includes identifying the bad data storage unit, locating a good copy of the data storage unit, staging the good copy of the data storage unit to cache, and destaging the good copy of the data storage unit from the cache to the bad data storage unit and to any other copies of the data storage unit in the data storage system. The method can be carried out in a data storage system having one or more servers or server clusters.

A related computer-implemented method, and a cluster in a data storage system are also provided.

BRIEF DESCRIPTION OF THE DRAWINGS

These and other features, benefits and advantages of the present invention will become apparent by reference to the following text and figures, with like reference numbers referring to like structures across the views, wherein.

DETAILED DESCRIPTION OF THE INVENTION

The invention is illustrated below in the context of a dual-cluster storage server such as the IBM ESS. However, the invention may be adapted for use with other data storage systems.

Figure 1:
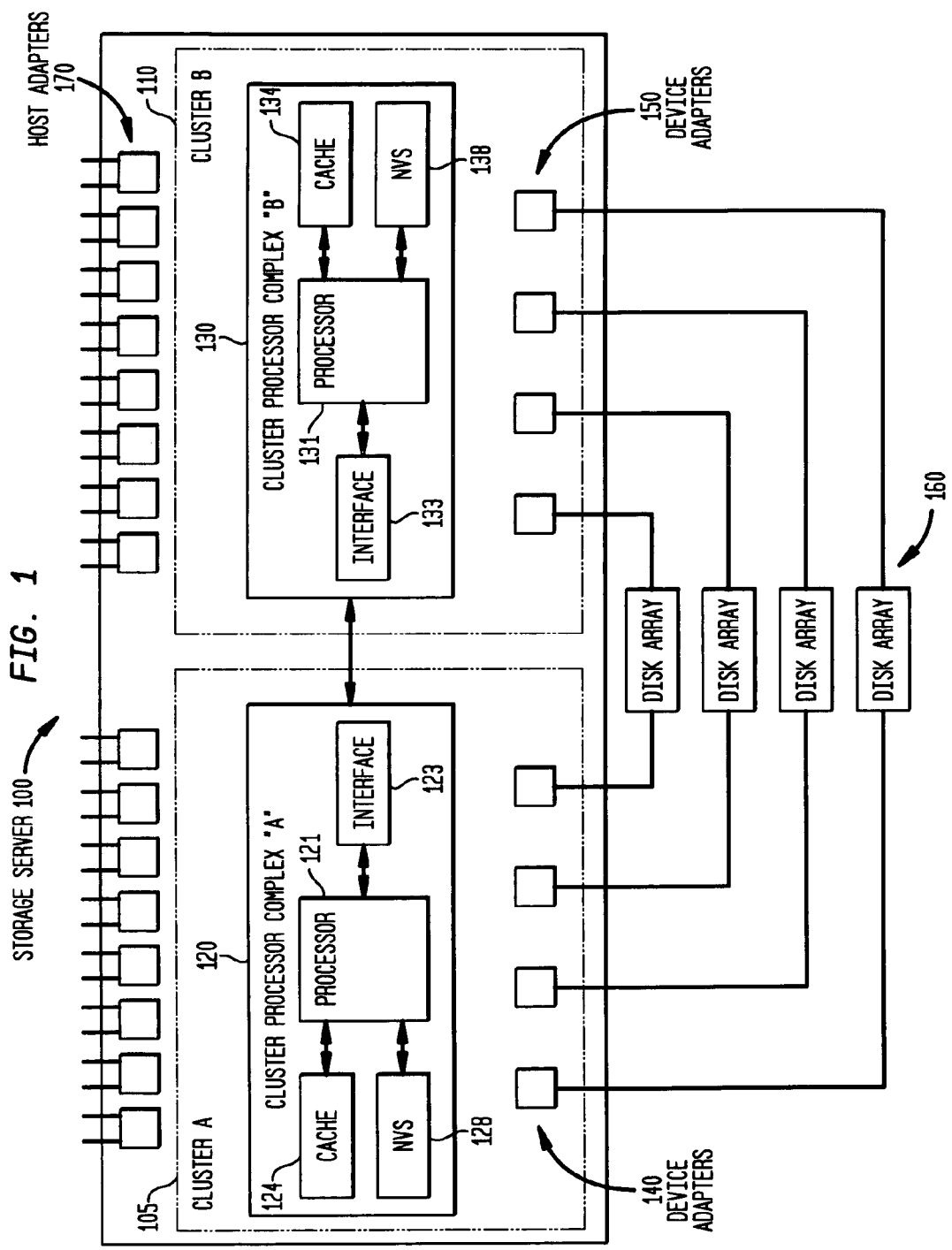
FIG. 1 illustrates a data storage system, according to the invention.

FIG. 1 illustrates a data storage system according to the invention. A data storage system or storage server 100, such as the IBM Enterprise Storage Server (ESS), for instance, is a high-capacity storage device that can back up data from a variety of different devices. For example, a large corporation or other enterprise may have a network of servers that each store data for a number of workstations used by individual employees. Periodically, the data on the host servers is backed up to the high-capacity data storage system 100 to avoid data loss if the host servers malfunction. The data storage system 100 can also provide data sharing between host servers since it is accessible to each host server. The data storage system 100 can have redundant resources to provide an additional safeguard against data loss. However, an aspect of the invention is also suitable for use with only one server or server cluster. As a further measure, the data of the data storage system 100 may be mirrored to another storage server, typically at a remote site. A user interface may be provided to allow a user to access information regarding the status of the data storage system 100.

The example data storage system 100 includes two clusters for redundancy. Each cluster 105, 110, e.g., "A" and "B", respectively, works independently, with its own operating system, and may include cluster processor complexes 120, 130 with cluster cache 124, 134, nonvolatile storage (NVS) 128, 138, and device adapters 140, 150. The device adapters (DA) 140, 150 are used to connect disks in the disk arrays 160 to the cluster processor complexes 120, 130. Each cluster 105, 110 contains four device adapters 140, 150. Each adapter is part of a pair, one on each cluster. A pair supports two independent paths to all of the disk drives served by the pair. Each disk array 160 is configured to be accessed by only one of the clusters. However, if a cluster failure occurs, the surviving cluster automatically takes over all of the disks. The disk arrays or ranks 160 can be configured as RAID (redundant array of independent disks) or non-RAID arrays. Alternatively, another high-capacity storage medium may be used.

Processors 121 and 131 execute software, including, e.g., firmware and/or micro code, to achieve the functionality described herein. The software may be stored in NVSs 128 and 138, respectively, for example, which are considered to be program storage devices. Interfaces 123 and 133, such as network interface cards, allow the clusters 105 and 110 to communicate with one another.

Host adapters (HAs) 170 are external interfaces that may support two ports, e.g., either small computer systems interface (SCSI) or IBM's enterprise systems connection (ESCON), which is an Enterprise Systems Architecture/390 and zSeries computer peripheral interface. Each HA connects to both cluster processor complexes 120, 130 so that either cluster can handle I/Os from any host adapter. The data storage system 100 contains four host-adaptor bays, each of which is connected to both clusters 105, 110 for redundancy.

Processing resources in the storage system 100 may maintain information regarding a hierarchy of storage resources. At the first, highest level of the hierarchy is the device level, which may include the storage system 100 itself. The second level represents storage resources within a storage system. For example, the storage system 100 may have logical subsystems (LSSs), which in turn are comprised of volumes, in the third level of the hierarchy. The LSS is a topological construct that includes a group of logical devices such as logical volumes, which may include tracks of recording medium associated with a logical disk drive. For example, a logical volume in a RAID array may be spread over different tracks in the disks in the array. Data may be stored in a number of data records on the tracks. In one approach, the records are sequentially numbered starting with 0. The first record, R0, is typically called the track descriptor record and contains data that the operating system normally uses to manage the track. The track-descriptor record follows the home address, which is a nine-byte field at the beginning of a track that contains information that identifies the physical track and its association with a cylinder. A cylinder is a discrete amount of storage on a disk device with a fixed number of tracks. A control program of each cluster uses the track-descriptor record to maintain certain information about the track, such as the Track ID, discussed further below. The Track ID identifies an LSS to which a track belongs.

As mentioned at the outset, each cluster 105, 110 owns, e.g., is associated with, different tracks in the disk array 160. Thus, cluster A 105 has read and write access to the tracks it owns, while cluster B 110 has read and write access to the tracks it owns. However, cluster A 105 does not have write access to the tracks owned by cluster B 110, and cluster B 110 does not have write access to the tracks owned by cluster A 105. This avoids a situation where both storage clusters try to write data to the same track at the same time. Note that write access is limited by protocol and not because of physical limitations. In fact, either cluster exercises the capability to write to all tracks when the data storage system 100 is in a failsafe, single cluster mode.

In one possible approach for assigning ownership of tracks, a track may belong to, e.g., be associated with, an LSS, in which case there is an affinity or association between an LSS and one of the storage clusters. In practice, multiple tracks in different disk arrays can be assigned to an LSS. Furthermore, in the normal, dual cluster mode, when both clusters 105, 110 are functional, ownership of the LSSs can be evenly divided between the clusters. For example, the even-numbered LSSs, e.g., the second, fourth, sixth, . . . LSSs, can be owned by cluster A 105, and the odd-numbered LSSs, e.g., the first, third, fifth, . . . LSSs, can be owned by cluster B 110. A cluster has write and read access to a track on a disk device when the cluster owns the LSS to which the track belongs. A cluster has read access to a track on a device even when the cluster does not own the LSS to which the track belongs. A cluster might also have write access to a cache copy of a track it does not own, such as a metadata track or a flash copy track, but any such access would be obtained via the owning cluster. A flash copy is an instant, point in time copy of a volume. Moreover, when one of the clusters 105 or 110 of the data storage system 100 fails, the data storage system 100 will operate in a fail safe, single cluster mode, in which case all LSSs are owned by the surviving cluster. The fail-safe mode reduces the chance of data loss and downtime.

Note that other approaches for assigning to ownership to the tracks is possible. For example, all of the tracks on a disk device or disk array may be owned by a cluster. In this approach, ownership is based on the physical arrangement of tracks rather than the logical arrangement.

Figure 2:
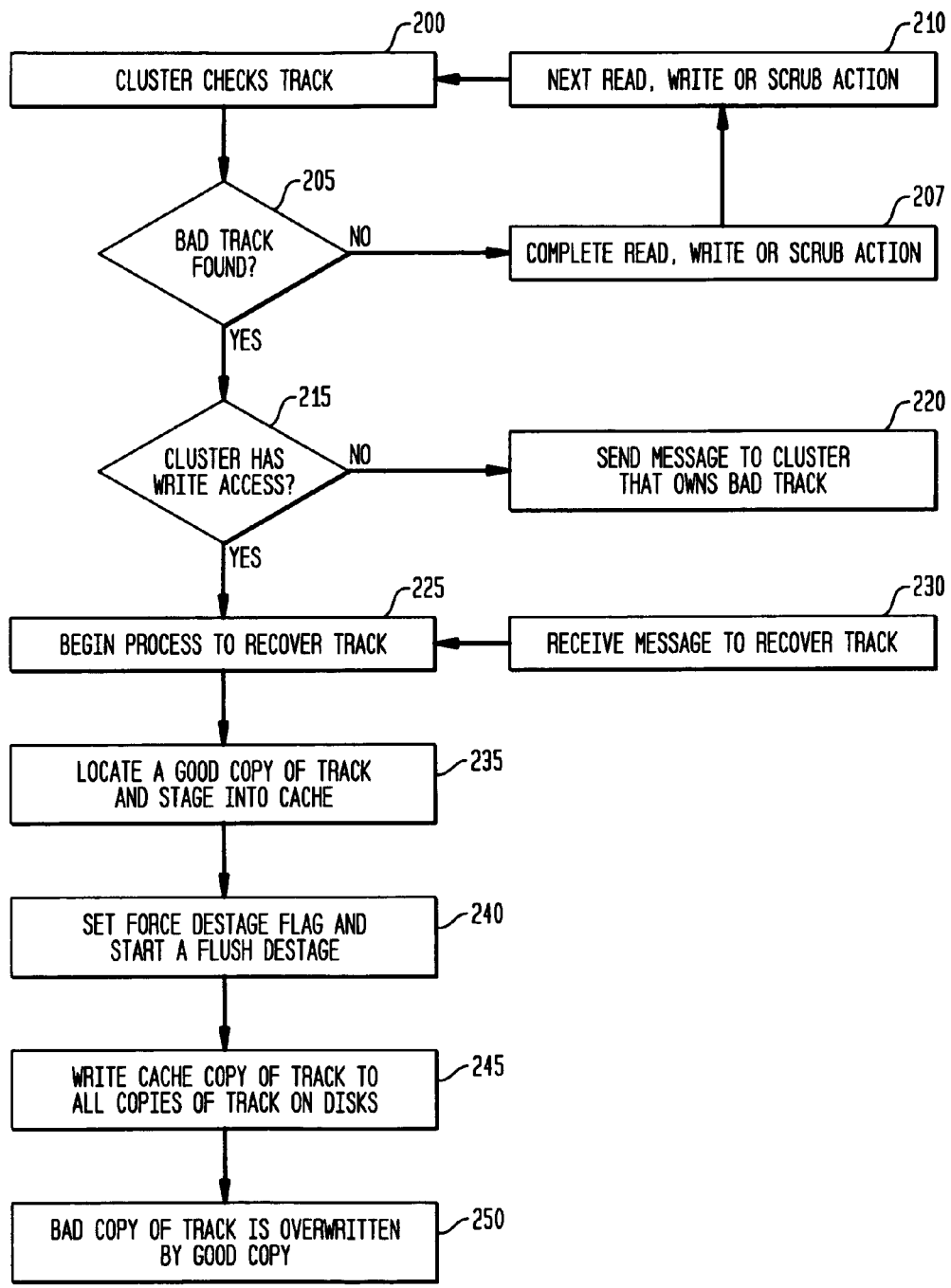
FIG. 2 illustrates a method for detecting and recovering a bad track, according to the invention.

FIG. 2 illustrates a method for detecting and recovering a bad track, according to the invention. Note that the process shown may be carried out by each cluster 105, 110 in parallel. At block 200, a cluster checks a track, such as when the track is read, written, or scrubbed by the cluster. Generally, tracks can be protected by constructs such as LRC, CRC and Generation Number. In particular, these constructs allow a track to be checked when the track is readable but its data is corrupted. LRC, or longitudinal redundancy check, also referred to as longitudinal parity check, is a method of error checking during data transfer that involves checking parity on a row of binary digits that are members of a set that forms a matrix. The LRC checks the data as it progresses from the host, through the controller, into the device adapter, and to the array. CRC, or cyclic redundancy check, is a redundancy check in which the check key is generated by a cyclic algorithm. The Generation number indicates different versions of a track, and is only used for system data. The Generation number of a track increases by one when the track is modified.

When tracks are read from or written to on a device, the LRC, CRC and Generation Number will be checked by software and hardware in the involved cluster. In particular, a cluster checks a track when the track is read, written, or scrubbed by the cluster. Here, read and write refer to a read or write operation requested from a host, which may include processes of data transfer between host and cache, and data stage from disk to cache or data destage from cache to disk. During these processes, LRC, CRC and Generation Number are checked. Scrubbing is an automatic background process that periodically read tracks on disk drivers to ensure that the data is good and readable. Scrubbing detects bad tracks that cannot be read, e.g., due to a physical defect. If any of the LRC, CRC and Generation Number do not match or otherwise indicate a discrepancy, e.g., error, in the track, the track is considered to be in a bad state or status. Similarly the track is considered bad if detected as such as by the scrubbing process. Otherwise, the track is in a good state or status. Note that micro code on the cluster trying to read or write a track may determine if the track is good or bad. The micro code for scrubbing tracks on a device also determines if a track is good or bad. Such micro code may be stored in the NVSs 128 or 138, for example, which are considered to be program storage devices for storing instructions that are executed by the processors 121 or 131 to achieve the desired functionality.

If the track is in a good state (block 205), the cluster completes the read, write or scrub action (block 207) and waits to process the next track that is read, written, or scrubbed (block 210).

If the track is in a bad state, the cluster determines whether it has write access to the track (block 215). This can be achieved as follows. A track may be identified by a Track ID (identifier), which includes, e.g., an LSS number, Volume number, and Track number or other appropriate identifiers. The Track ID can be maintained in a data record of a track, such as the above-mentioned track-descriptor record. When processing a track, a control program at each cluster examines the Track ID to obtain the LSS number. The control program may then compare the LSS number to a list of numbers that have been associated with the cluster. This list can be stored at each cluster, such as in the NVSs 128 or 138, for instance. Alternatively, the Track ID or other data associated with a track can directly identify a cluster to which it has been assigned. In any case, the cluster knows whether it owns the track, such as by knowing the LSS whose number is included in the track ID of the track that is currently being examined. If the cluster owns the LSS, then it has write access to the track; otherwise it does not.

At block 215, if the cluster does not have write access to the bad track, it sends a message to the cluster that does have write access to the bad track, e.g., the cluster that owns the bad track. In a dual cluster device, if cluster A 105 determines that it does not own the bad track, it can determine by default that the other cluster, cluster B 110, owns it. In this case, cluster A 105 sends a message to cluster B 110 to inform it of the identity of the bad track, e.g., by including the Track ID in the message. Alternatively, cluster A can access a list that indicates which LSSs have been associated with which clusters to identify the cluster that owns the bad track. This approach may be particularly useful when there are more than two clusters. Cluster A 105 can send any type of message to cluster B in this regard, such as a mail message, e.g., a message via a network or dedicated connection. The processor 121 of cluster A 105 can communicate with the processor 131 of cluster B 110 via the network interfaces 123 and 133, for instance.

A process begins for recovering the track at block 225 for the cluster that has write access to the bad track. At block 235, a good copy of the track is located and staged into cache, e.g., cache 124 in cluster A 105. Staging refers to the operation of reading data from the physical disk into cache. Destaging refers to the opposite operation, e.g., writing data from cache to the physical disk. These processes are normally used in the data storage device to read and write customer data. To locate the good copy, a system data manager may be used to keep a table indicating where copies of a track are stored, and whether the tracks are good or bad. The existing stage/destage process in the data storage system 100 can be used to find a good copy of a track if it is available, such as by attempting to stage one copy at a time until a good copy is located. At block 240, a force destage flag is set, and a flush destage is started. The existing destage process in the data storage system 100 may be used to guarantee that the destage process will cause the data in cache to be written to all copies of the track. At block 245, the cached, good copy of the track is written to all copies of the track on the disks to achieve the flush destage. As a result, the bad copy of the track is overwritten by the good copy (block 250). Advantageously, all bad copies of the track will be automatically recovered, even if there are bad copies that were not identified. The above process can be repeated to detect and recover additional bad tracks.

Note that the invention is applicable to a data storage system using any type of storage device, including magnetic, optical and tape storage systems. While an example was provided in which tracks of a disk device are recovered, the invention is generally applicable to recovering any type of data storage unit. Moreover, the invention can be, implemented on a data storage system having only one server, or it can be implemented on one server cluster of a multi-cluster system. In either of these cases, the given server or server cluster identifies the bad track, and has ownership of the bad track. Thus, the process of FIG. 2 can be carried out without the need for the decision block 215 to determine ownership of the bad track. Blocks 220 and 230 are also not applicable. The remaining blocks are applicable. The process generally involves identifying the bad data storage unit, locating a good copy of the data storage unit, staging the good copy of the data storage unit to cache, and destaging the good copy of the data storage unit from the cache to the bad data storage unit and to any other copies of the data storage unit in the data storage system.

Note that the invention described herein may be deployed on an existing or new computing infrastructure, such as a data storage system, by integrating computer-readable code into the data storage system, where the code in combination with the data storage system is capable of performing a method for recovering a bad data storage unit in the data storage system and any other functionality described herein. Furthermore, the invention may be deployed on an existing or new computing infrastructure, such as a first cluster of a data storage system that includes at least the first cluster and a second cluster, by integrating computer-readable code into the first cluster, where the code in combination with the first cluster is capable of performing a method for recovering a bad data storage unit in the data storage system and any other functionality described herein.

The invention has been described herein with reference to particular exemplary embodiments. Certain alterations and modifications may be apparent to those skilled in the art, without departing from the scope of the invention. The exemplary embodiments are meant to be illustrative, not limiting of the scope of the invention, which is defined by the appended claims.

What is claimed is:

1. At least one program storage device in a data storage system that includes at least a first server cluster and a second server cluster and a disk storage device accessible by each said first and second server clusters, wherein multiple copies of data are stored in different data tracks of said disk storage device, the at least one program storage device tangibly embodying a program of instructions executable by at least one processor to perform a method for recovering a bad data track, the method comprising:

identifying the bad data track during at least one of reading, writing and scrubbing of the bad data track by one of said first or second server clusters, the bad data track identified as having a bad status based on a discrepancy in at least one of a longitudinal redundancy check, cyclic redundancy check and Generation Number associated therewith;

determining which of the first and second server clusters owns the bad data track, said determining comprising determining a logical subsystem associated with the bad data track based on an identifier associated with the bad data track, and determining which of said first server or second server cluster the logical subsystem is associated with; and, one of: executing a process at the first cluster for recovering the bad data track if determined that the bad track is owned by the first cluster; or communicating a message to the second cluster that identifies the bad data track if it is determined that the bad data track is owned by the second cluster, the second cluster executing a process for recovering the bad data track responsive to receipt of the message, wherein:

the process for recovering the bad data track comprises locating a good copy of the data track on said disk storage device, staging the good copy of the data track to cache, and writing the good copy of the data track from the cache to the bad data track.

2. The at least one program storage device of claim 1, wherein:

the process for recovering the bad data storage unit comprises locating a good copy of the data storage unit, staging the good copy of the data storage unit to cache, and destaging the good copy of the data storage unit from the cache to the bad data storage unit and to any other copies of the data storage unit in the data storage system.

3. A method for deploying computing infrastructure, comprising integrating computer-readable code into a data storage system having at least a first server cluster and a second server cluster and a disk storage device accessible by each said first and second server clusters, wherein multiple copies of data are stored in different data tracks of said disk storage device, where the code in combination with the data storage system server clusters is capable of performing a method for recovering a bad data track in the data storage system, the method comprising:

identifying the bad data track during at least one of reading, writing and scrubbing of the bad data track by one of said first or second server clusters, the bad data track identified as having a bad status based on a discrepancy in at least one of a longitudinal redundancy check, cyclic redundancy check and Generation Number associated therewith;

determining which of the first and second server clusters owns the bad data track, said determining comprising determining a logical subsystem associated with the bad data track based on an identifier associated with the bad data track, and determining which of said first server or second server cluster the logical subsystem is associated with; and, one of: executing a process at the first cluster for recovering the bad track if determined that the bad track is owned by the first cluster; or communicating a message to the second cluster that identifies the bad data track if it is determined that the bad data track is owned by the second cluster, the second cluster executing a process for recovering the bad data track responsive to receipt of the message, the process for recovering the bad data track comprises:

locating a good copy of the data track;

staging the good copy of the data track to cache; and destaging the good copy of the data track from the cache to the bad data track and to any other copies of the data track in the data storage system.

4. A method for deploying computing infrastructure, in a data storage system that includes at least a first server cluster and a second server cluster and a disk storage device accessible by each said first and second server clusters, wherein multiple copies of data are stored in different data tracks of said disk storage device, where the code in combination with the first or second server cluster is capable of performing a method for recovering a bad data track in the data storage system, the method comprising:

identifying the bad data track during at least one of reading, writing and scrubbing of the bad data track by one of said first or second server clusters, the bad data track identified as having a bad status based on a discrepancy in at least one of a longitudinal redundancy check, cyclic redundancy check and Generation Number associated therewith;

determining which of the first and second server clusters owns the bad data track, said determining comprising determining a logical subsystem associated with the bad data track based on an identifier associated with the bad data track, and determining which of said first server or second server cluster the logical subsystem is associated with; and, one of: executing a process at the first cluster for recovering the bad track if determined that the bad track is owned by the first cluster; or communicating a message to the second cluster that identifies the bad data track if it is determined that the bad data track is owned by the second cluster, the second cluster executing a process for recovering the bad data track responsive to receipt of the message, the process for recovering the bad data track comprises:

locating a good copy of the data track on said disk storage device, staging the good copy of the data track to cache, and writing the good copy of the data track from the cache to the bad data track.

* * * * *